United States Patent [19]
Uriu et al.

[11] Patent Number: 5,301,184
[45] Date of Patent: Apr. 5, 1994

[54] CONTROL SYSTEM FOR SWITCHING DUPLICATED SWITCH UNITS IN ATM EXCHANGE

[75] Inventors: Shiro Uriu; Satoshi Kakuma; Yoshihiro Uchida, all of Kawasaki, Japan

[73] Assignee: Fujitsu Limited, Kawasaki, Japan

[21] Appl. No.: 972,025

[22] Filed: Nov. 6, 1992

[30] Foreign Application Priority Data

Nov. 8, 1991 [JP] Japan .................. 3-292616

[51] Int. Cl.⁵ .................. H04L 12/56; H04Q 11/04
[52] U.S. Cl. .................. 370/16; 370/60; 370/60.1; 370/94.1; 340/827
[58] Field of Search .................. 370/14, 16, 54, 58.1, 370/58.2, 58.3, 60, 60.1, 94.1, 94.2; 340/825.01, 825.02, 825.03, 826, 827; 371/8.1, 8.2, 9.1, 11.1, 11.2, 11.3; 379/268, 271, 272, 273, 279

[56] References Cited
U.S. PATENT DOCUMENTS

| | | | |
|---|---|---|---|
| 5,067,123 | 11/1991 | Hyodo et al. | 370/60 |
| 5,072,440 | 12/1991 | Isono et al. | 370/16 |
| 5,084,867 | 1/1992 | Tachibana et al. | 370/16 |
| 5,119,369 | 6/1992 | Tanabe et al. | 370/60 |
| 5,153,578 | 10/1992 | Izawa et al. | 370/16 |
| 5,191,577 | 3/1993 | Uchida et al. | 370/60 |

Primary Examiner—Douglas W. Olms
Assistant Examiner—Alpus H. Hsu
Attorney, Agent, or Firm—Nikaido, Marmelstein, Murray & Oram

[57] ABSTRACT

In a control system for switching between a first system and a second system of a duplicated selecting structure in an ATM exchange, one of the first and second systems operates as an active system, and the other operates as a standby system. A generator unit writes specific bits into ATM cells received via an input transmission line. The specific bits respectively written into ATM cells to be transferred via the active system indicate a first state, and those respectively written into the ATM cells to be transferred via the standby system indicate a second state. A first table stores the specific bits respectively assigned to VPI/VCI pairs related to the ATM cells transferred via the first system. A second table stores the specific bits respectively assigned to VPI/VCI pairs related to the ATM cells transferred via the second system. A selecting unit compares the specific bits written into the ATM cells with the specific bits stored in the first and second tables by using the VPI/VCI pairs of the ATM cells, and outputs only ATM cells respectively having specific bits respectively indicating the first state to an output transmission line.

10 Claims, 6 Drawing Sheets

CONTROL SYSTEM FOR SWITCHING DUPLICATED SWITCH UNITS IN ATM EXCHANGE

BACKGROUND OF THE INVENTION

1. Field of the Invention

The present invention generally relates to ATM (Asynchronous Transfer Mode) exchanges, and more particularly to a control system for switching between duplicated switch units in an ATM exchange.

2. Description of the Prior Art

Recently, there has been considerable activity in the research of a B-ISDN (Broadband-Integrated Services Digital Network) as well as ATM exchanges used for such a B-ISDN. In order to attain high reliability, it is desirable to employ a redundant (duplicated) structure with respect to important parts of ATM exchanges.

In the ATM exchanges, switching is carried out for each cell. The duplicated structure has two systems, one of which is the active system, and the other of which is the standby system. If a fault has occurred in the duplicated structure, the standby system must immediate as the active system. In this case, it is desirable to perform the switching without any increase in the buffer capacity and complex control processing.

Figure 1:
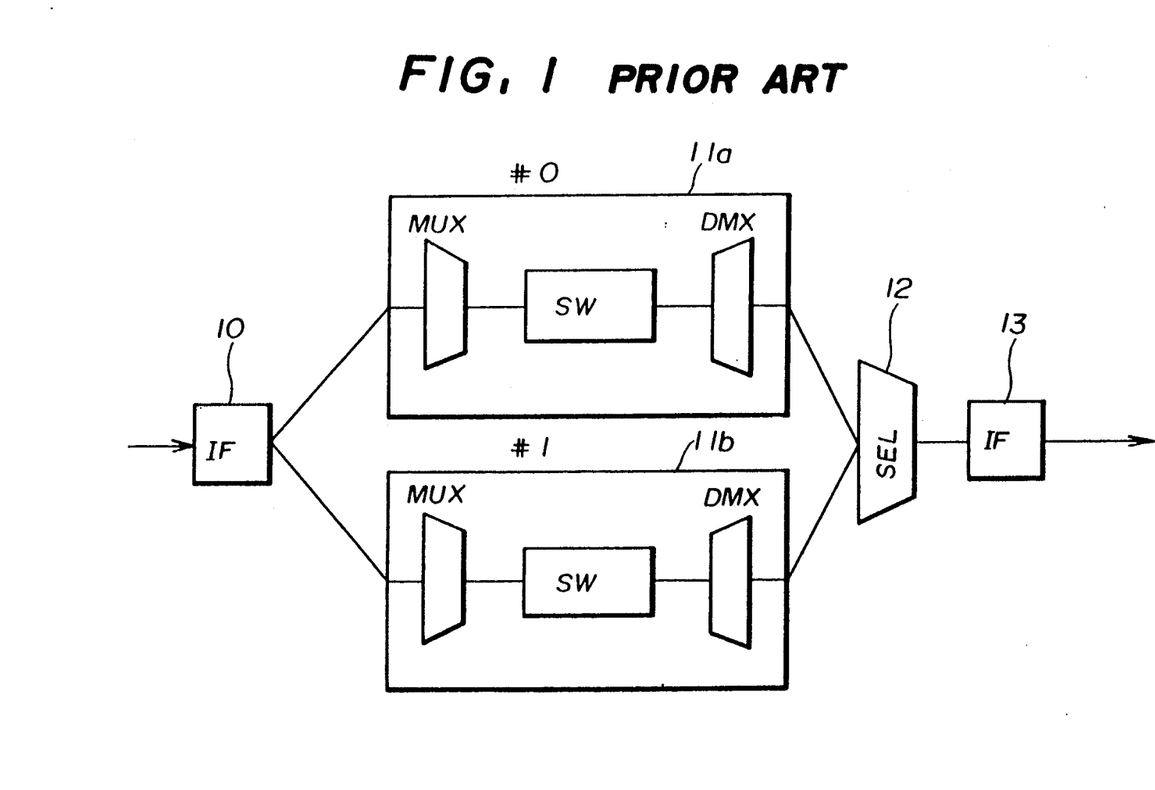
FIG. 1 is a block diagram of a conventional ATM exchange having a duplicated switch structure.
Figure 2:
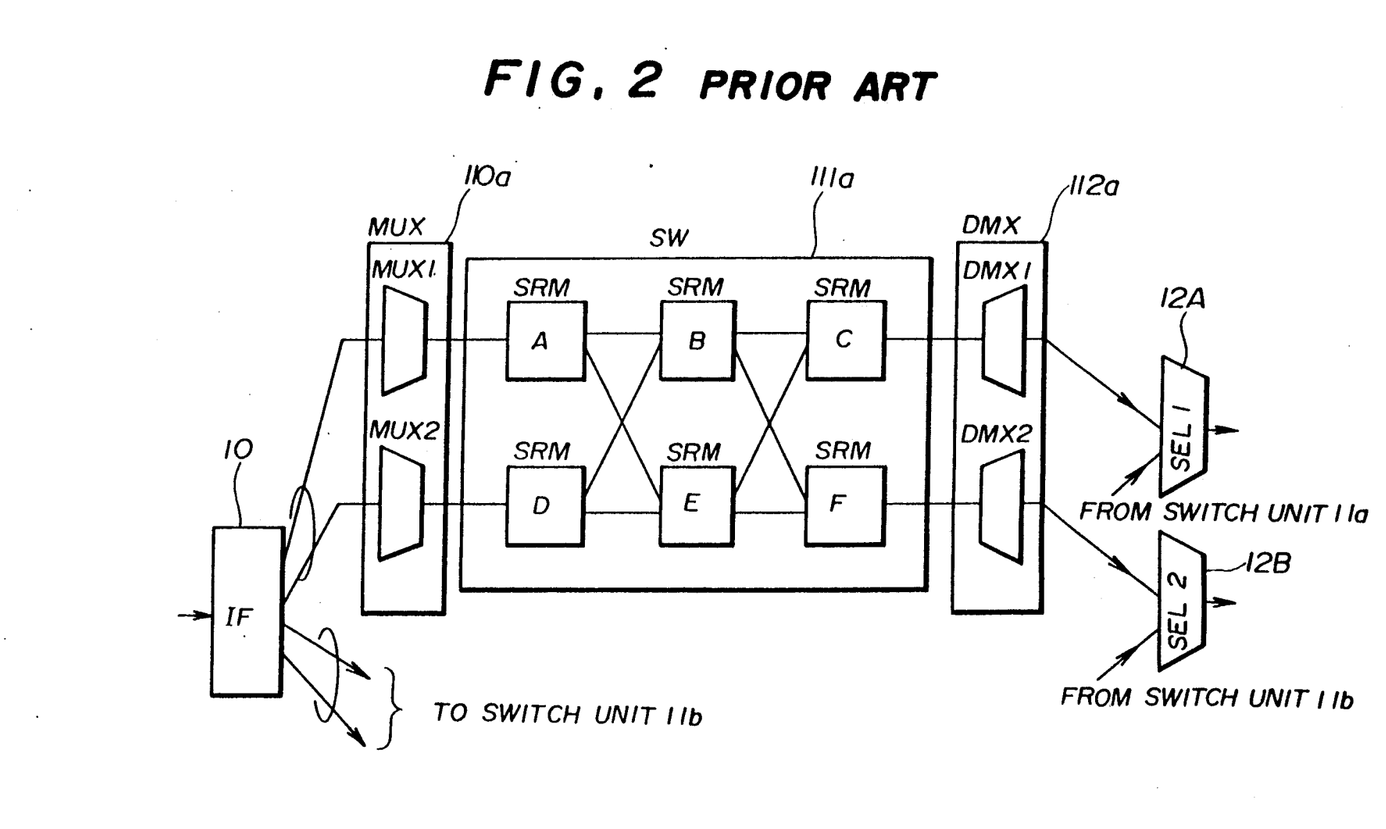
FIG. 2 is a block diagram of a switch unit shown in the ATM exchange.

FIG. 1 is a block diagram of a conventional ATM exchange having a duplicated structure, and FIG. 2 is a block diagram of an ATM switch shown in FIG. 1.

Referring to FIG. 1, the ATM exchange comprises a transmission line interface 10, two switch units 11a and 11b, a selector 12, and a transmission line interface 13. A duplicated structure consists of the switch unit 11a serving as system #0, and the switch unit 11b serving as system #1. Each of the switch units 11a and 11b is made up of a multiplexer MUX, a switch SW, and a demultiplexer DMX.

One of the switch units 11a and 11b functions as the active system, and the other switch unit functions as the standby system. For example, the operation modes of the switch units 11a and 11b are periodically interchanged with each other. If a fault has occurred in the active system, the active system is switched to the standby system, while the standby system is switched to the active system. The above switchover is achieved by means of, for example, hardware.

It will now be assumed that the switch unit 11a is the active system and the switch unit 11b is the standby system. ATM cells transferred sequentially via the incoming transmission line are supplied to both the switch units 11a and 11b via the transmission line interface 10. During the above operation, the transmission line interface 10 receives an instruction signal from a control device (not shown for the sake of convenience), and writes a one-bit active-system indication bit into each ATM cell. For example, the active-system indication bit can be written into an ATM header of each ATM cell. According to the CCITT Recommendations I.361 and I.363, one ATM cell is a piece of 53-byte data, and consists of a 5-byte header and a 48-byte information field. In cases where routing information (route indication information) for switching is added to the ATM header of each ATM cell, the one-bit active-system indication bit is written into the routing information. For example, "1" is written, as the active-system indication bit, into each ATM cell output to the switch unit 11a, and "0" is written into each ATM cell output to the switch unit 11b.

The ATM cells with the active-system indication bit added thereto are switched in the switch units 11a and 11b, and are output to the selector 12. The selector 12 refers to the active-system indication bit in each ATM cell, and allows only the ATM cells from the active system (switch unit 11a in the example being considered) to pass through the selector 12. That is, the ATM cells having the active-system indication bit "1" are allowed to pass through the selector 12.

As has been described previously, the switching between the active system and the standby system is carried out periodically or carried out when a fault has occurred in the active system. In the example being considered, when a fault has occurred in the switch unit 11a, the switch unit 11a is switched to the standby system, and the switch unit 11b is switched to the active system under the control of the control device (not shown). The transmission line interface 10 writes the active-system indication bit "0" into each ATM cell output to the switch unit 11a, and writes the active-system indication bit "1" into each ATM cell output to the switch unit 11b. In this case, it is necessary for the selector 12 to select all ATM cells, each having the active-system indication bit "1", from the switch unit 11a which was previously the active system. After the above selection is completed, that is, all ATM cells, each having the active-system indication bit "1", from the switch unit 11a have been transferred to the transmission line interface 13, the selector 12 selects all ATM cells, each having the active-system indication bit "1", from the switch unit 11b which is the active system at present.

FIG. 2 shows the structure of the switch unit 11a shown in FIG. 1. The structure of the switch unit 11b is the same as that of the switch unit 11a, and is therefore omitted. The multiplexer (MUX) 110a comprises two multiplexers MUX1 and MUX2. The switch (SW) 111a consists of three switching stages, each of which includes two SRMs (Self Routing Module), A and D, B and E, and C and F. Each of the SRMs at the first and second stages is connected to the two SRMs at the second and third stages, respectively. For example, the SRM A of the first stage is connected to the SRMs B and E of the second stage. Each of the SRMs has the switching function of directing each ATM cell to one of a plurality of outputs thereof (two outputs in the structure shown in FIG. 2) in accordance with the route indication information contained in the routing information and defined for each of the switching stages. The SRMs C and F of the third (final) stage are connected to demultiplexers DMX1 and DMX2 of the demultiplexer (DMX) 112a, respectively. The demultiplexers DMX1 and DMX2 are respectively connected to selectors (SEL1) 12A and (SEL2) 12B of the selector 12. The selectors 12A and 12B receive ATM cells from the switch unit 11b in the same manner as the above.

When the switch unit 11a is operating as the active system, each ATM cell input from the multiplexer 110a to the switch 111a has the active-system indication bit "1". Each ATM cell is subjected to the switching operation by means of the SRMs of the switch 111a, and is output to either the demultiplexer DMX1 or DMX2.

When the switching between the active system and the standby system is performed under the control of the control device, the active-system indication bit "0" is written into each ATM cell output to the switch 111a, and the active-system indication bit "1" is written into each ATM cell output to the other switch. The selectors 12A and 12B select all ATM cells which respectively have the active-system indication bit "1" and which are output from the switch 111a that was previously the active system. Further, the selectors 12A and 12B select all ATM cells which respectively have the active-system indication bit "1" and which are output from the other switch that is presently the active system after all the ATM cells respectively having the active-system indication bit "1" have been output from the switch 111a.

As has been described above, the conventional ATM exchange shown in FIGS. 1 and 2, the outputting of ATM cells output from the active system switched from the standby system is started after all the ATM cells remaining in the switch which was previously the active system have been read therefrom. Hence, it is necessary to hold the ATM cells in the active system which was previously switched from the standby system until all the ATM cells respectively having the active-system indication bit "1" have been read out from the other switch which was previously the active system. As a result, the switch units 11a and 11b have a large buffer (storage) capacity (particularly, the buffer capacity of the demultiplexers DMX1 and DMX2) used for temporarily holding the ATM cells.

In addition, the conventional ATM exchange has the following disadvantage. The demultiplexer DMX1 is connected to the SRM C, and therefore the demultiplexer DMX1 does not have information concerning the status (the available buffer capacity) of the SRM F. Hence, the demultiplexer DMX1 does not determine whether or not the SRM is completely empty. The above holds true for the demultiplexer DMX2, which does not have information converting the status of the SRM C. Hence, it is very difficult to determine the timing for switching in the selectors 12A and 12B. It is to be noted that the selectors 12A and 12B connected to the same demultiplexer (DMX) 112a must be concurrently switched.

Furthermore, it is necessary to define various control signals and provide devices for generating the control signals in order to achieve the above-mentioned switching between the active system and the standby system. For example, a control signal is needed to select only ATM cells respectively having the active-system indication bit "1" after switching. Further, it is necessary to use a control signal showing that all ATM cells respectively having the active-system indication bit "1" have been output from the switch unit which was the active system before switching.

SUMMARY OF THE INVENTION

It is a general object of the present invention to provide a control system for switching between the active system and the standby system of a duplicated structure in an ATM exchange, in which the above disadvantages are eliminated.

A more specific object of the present invention is to provide a control system capable of performing switching between the active system and the standby system without a large buffer capacity, supervising of the active-system indication bits, and a large number of control signals.

The above objects of the present invention are achieved by a control system for switching between a first system and a second system of a duplicated structure in an ATM exchange, one of the first and second systems operating as an active system, and the other one of the first and second systems operating as a standby system, the control system comprising: generator means for writing specific bits into ATM cells received via an input transmission line, the specific bits respectively written into ATM cells to be transferred via the active system indicating a first state, the specific bits respectively written into the ATM cells to be transferred via the standby system indicating a second state; first table means, provided in the first system, for storing the specific bits respectively assigned to VPI/VCI pairs related to the ATM cells transferred via the first system; second table means, provided in the second system, for storing the specific bits respectively assigned to VPI/VCI pairs related to the ATM cells transferred via the second system; and selecting means, coupled to the generator means and the first and second table means, for comparing the specific bits written into the ATM cells with the specific bits stored in the first and second table means by using the VPI/VCI pairs of the ATM cells and for outputting only ATM cells respectively having specific bits respectively indicating the first state to an output transmission line.

The above objects of the present invention are also achieved by a control system for switching between a first system and a second system of a duplicated structure in an ATM exchange, one of the first and second systems operating as an active system, and the other one of the first and second systems operating as a standby system, the control system comprising: generator means for writing specific bits having a first state into ATM cells received via an input transmission line in a first case where no switching is indicated and for writing specific bits having a second state into first (post-switch) ATM cells related to respective VPI/VCI pairs obtained after switching; first table means, provided in the first system, for storing the specific bits respectively assigned to VPI/VCI pairs related to the ATM cells transferred via the first system, the specific bits stored in the first table means respectively indicating the second state when the first system operates as the active system; second table means, provided in the second system, for storing the specific bits respectively assigned to VPI/VCI pairs related to the ATM cells transferred via the second system, the specific bits stored in the second table means respectively indicating the first state when the second system operates as the standby system; and selecting means, coupled to the generator means and the first and second table means, for selecting ATM cells transferred via the first system when the first system operates as the active system and for selecting ATM cells transferred via the second system which was previously the standby system but has become the active system because of the switching, after changing one of the specific bits stored in the second table means and related to the VPI/VCI pair of one of the first ATM cells from the first state to the second state each time the one of said first ATM cells is received.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 3:
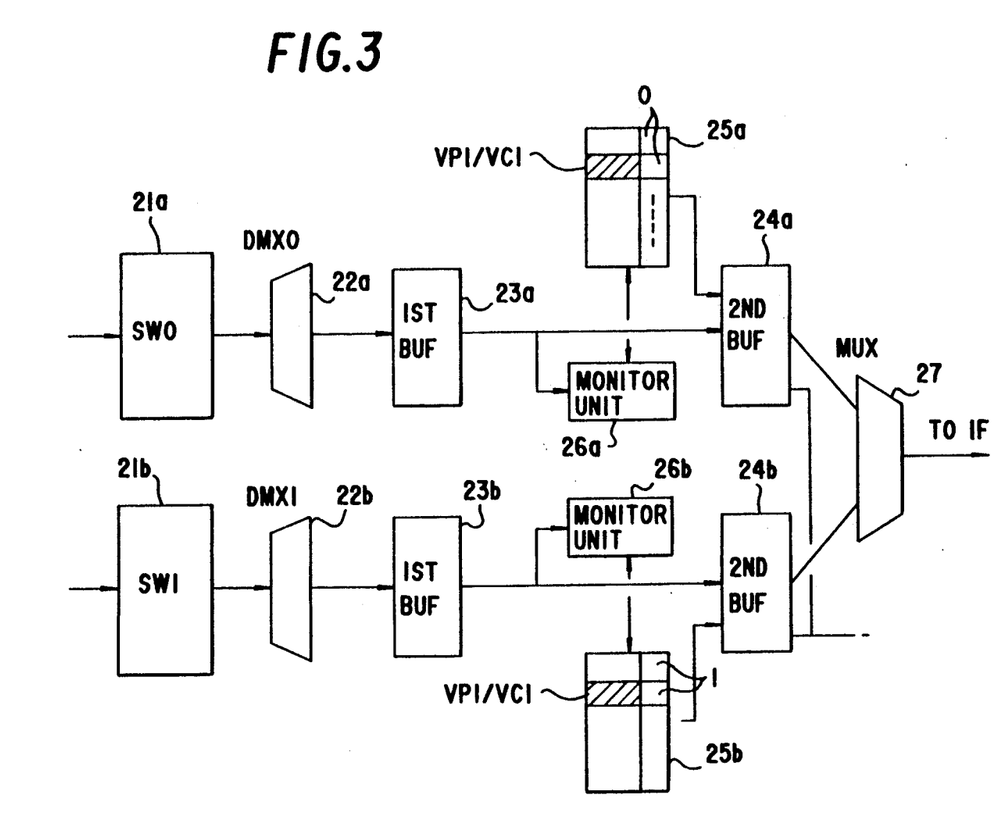
FIG. 3 is a block diagram illustrating an overview of the present invention.

FIG. 3 is a block diagram showing an overview of the present invention. An ATM exchange shown in FIG. 3 comprises a switch (SW0) 21a, a demultiplexer (DMX0) 22a, a first buffer 23a, a second buffer 24a, a VPI/VCI (Virtual Path Identifier/Virtual Channel Identifier) table 25a, and a monitor unit 26a. The above structural elements form a first system. Further, the ATM exchange shown in FIG. 3 comprises a switch (SW1) 21b, a demultiplexer (DMX1) 22b, a first buffer 23b, a second buffer 24b, a VPI/VCI table 25b, and a monitor unit 26b. These structural elements form a second system. Furthermore, the ATM exchange shown in FIG. 3 comprises a multiplexer (MUX) or selector 27 connected to the second buffers 24a and 24b and a transmission line interface (not shown in FIG. 3). The first and second systems form a duplicated structure of the ATM switch.

According to the present invention, ATM cells respectively having the active-system indication bit "1" are selected on the basis of the destinations of the ATM cells in the unit of path, rather than use of hardware.

It will now be assumed that the first system including the switch 21a is operating as the active system, and the second system including the switch 21b is operating as the standby system. The switches 21a and 21b respectively receive ATM cells from a transmission line interface (not shown in FIG. 3) via respective multiplexers in the same manner as shown in FIG. 2. The transmission line interface writes the active-system indication bit "1" into each ATM cell output to the switch 21a, and writes the active-system indication bit "0" into each ATM cell output to the switch 21b. The ATM cells applied to the switch 21a are subjected to switching therein, and the ATM cells applied to the switch 21b are subjected to switching therein. Then, the ATM cells output from the switch 21a are sequentially stored in the first buffer 23a via the demultiplexer 22a, and the ATM cells output from the switch 21b are sequentially stored in the first buffer 23b via the demultiplexer 22b.

The monitor unit 26a of the first system refers to the ATM header (including the active-system indication bit) of each ATM cell stored in the first buffer 23a, and compares the read ATM header with the contents of the VPI/VCI table 25a. The VPI/VCI table 25a stores a plurality of pairs of VPI/VCI relating to ATM cells transferred via the first system (link), and active-system indication bits which are provided for the respective VPI/VCI pairs and indicate whether the respective VPI/VCI pairs are active systems or standby systems. As will be described layer, the active-system indication bits in the VPI/VCI table 25a are set by the monitor unit 26a. The writing of the ATM cells into the second buffer 24a is controlled according to the contents of the VPI/VCI table 25a.

Similarly, the monitor unit 26b of the second system refers to the ATM header (including the active-system indication bit) of each ATM cell stored in the first buffer 23b, and compares the read ATM header with the contents of the VPI/VCI table 25b. The VPI/VCI table 25b stores a plurality of pairs of VPI/VCI relating to ATM cells transferred via the second system (link), and active-system indication bits which are provided for the respective VPI/VCI pairs and indicate whether the respective VPI/VCI pairs are active systems or standby systems. As will be described later, the active-system indication bits in the VPI/VCI table 25b are set by the monitor unit 26b. The writing of the ATM cells into the second buffer 24b is controlled according to the contents of the VPI/VCI table 25b.

When the first system is switched from the active system to the standby system and the second system is switched from the standby system to the active system, the active-system indication bit "0" is written into each ATM cell applied to the switch 21a, and the active-system indication bit "1" is written into each ATM cell applied to the switch 21b. The first ATM cell having the active-system indication bit "0" is written into the first buffer 23a via the switch 21a and the demultiplexer 22a. The monitor unit 26a refers to the VPI/VCI table 25a by using the VPI/VCI held in the first ATM cell. The monitor unit 26a compares the active-system indication bit held in the first ATM cell with the active-system indication bit related to the VPI/VCI of the first ATM cell stored in the VPI/VCI table 25a. The active-system indication bit of the first post-switch ATM cell after switching is "0", while the corresponding active-system indication bit stored in the VPI/VCI table 25a is "1" because the first system was previously the active system. In this case, the monitor unit 26a changes the active-system indication bit related to the VPI/VCI of the first ATM cell stored in the VPI/VCI table 25a from "1" to "0". The second buffer 24a refers to the contents of the VPI/VCI table 25a, and prevents the first ATM cell from being written therein. It will be noted that the above-mentioned first ATM cell will exist for each VPI/VCI pair (that is, each call).

In the second system which has become the active system, the ATM cells after switching are sequentially written into the first buffer 23b. The monitor unit 26b compares the active-system indication bit in each ATM cell with that related to the VPI/VCI of each ATM cell. When the comparison is performed with respect to the first ATM cell for one of the VPI/VCI pairs, the two active-system indication bits to be compared are not equal to each other. That is, the active-system indication bit of the first ATM cell after switching is "1", while the corresponding active-system indication bit stored in the VPI/VCI table 25b is "0". In this case, the monitor unit 26b changes the active-system indication bit related to the VPI/VCI of the first ATM cell and stored in the VPI/VCI table 25b from "0" to "1". The writing of ATM cells into the second buffer 24b is performed with reference to the contents of the VPI/VCI table 25b. Since the two active-system indication bits become "1", the first ATM cell being considered can be written into the second buffer 24b.

In the above-mentioned manner, the writing of ATM cells into the second buffers 24a and 24b is carried out by referring to the contents of the VPI/VCI tables 24a and 24b, and the active-system indication bits stored therein are controlled by the monitor units 26a and 26b.

The first and second systems are controlled in the same manner, and hence ATM cells cannot be lost.

Figure 4:
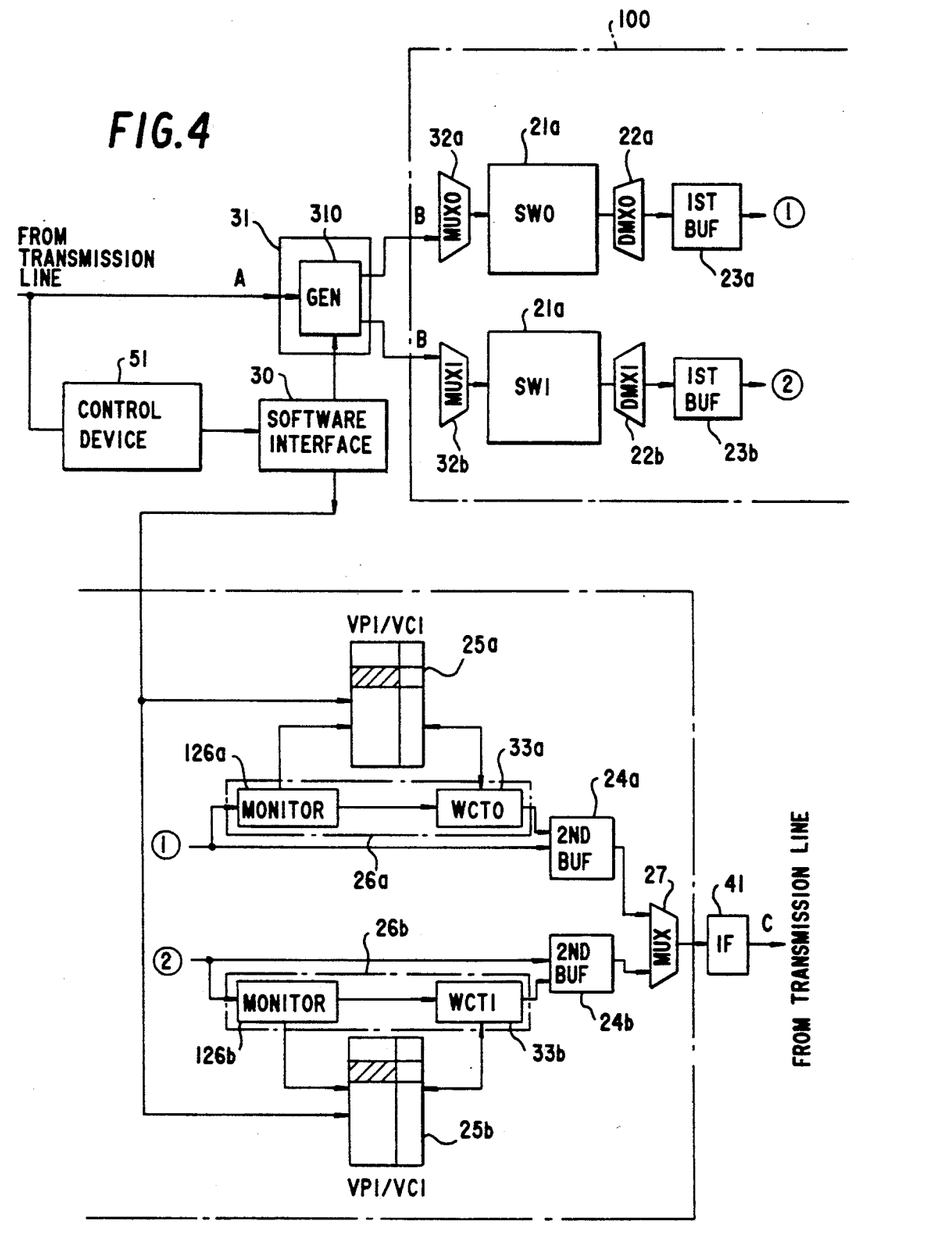
FIG. 4 is a block diagram of a first embodiment of the present invention.

FIG. 4 shows the first embodiment of the present invention. In FIG. 4, parts that are the same as parts shown in FIG. 3 are given the same numbers as previously. A transmission line interface 31 is connected to input terminals of a duplicated structure 100 indicated by the box depicted by the one-dot chained line. The interface 31 includes an active-bit indication bit generator 310, which is connected to a software interface 30. The transmission line interface 31 outputs ATM cells having identical information to the first and second systems of the duplicated selecting structure 100. The software interface 30 receives, from a control device 51, an instruction signal indicating which one of the first and second systems should operate as the active system.

The duplicate selecting structure 100 comprises multiplexers 32a (MUXO) and 32b (MUX1). The multiplexers 32a and 32b receive the ATM cells from the transmission line interface 31, and output these ATM cells to the switch 21a (SWO) and 21b (SW1), respectively.

A write controller (WCTO) 33a is provided between the VPI/VCI table 25a and the second buffer 24a. Similarly, a write controller (WCT1) 33b is provided between the VPI/VCI table 25b and the second buffer 24b. The write controller 33a controls the writing of ATM cells from the first buffer 23a on the basis of the contents of the VPI/VCI table 25a. Similarly, the write controller 33b controls the writing of ATM cells from the second buffer 24b on the basis of the contents of the VPI/VCI table 25b. The contents of the tables 25a and 25b can be accessed by the control device 51 via the software interface 30. A transmission line interface 41 is connected to the multiplexer 27. As indicated, the monitor unit 26a shown in FIG. 3 corresponds to a monitor. 126a and the write controller 33a. Correspondingly, the monitor unit 26b shown in FIG. 3 corresponds to a monitor 126b and the write controller 33b.

A description will now be given of the operation of the ATM exchange shown in FIG. 4. At the time of initializing the ATM exchange, the control device 51 assigns, via the software interface 30, the active-system indication bit to each VPI/VCI pair in each of the VPI/VCI tables 25a and 25b. In practice, a VPI/VCI pair is set each time a call is generated and is canceled each time the call is completed. Hence, the control device 51 writes a VPI/VCI pair into the VPI/VCI tables 25a and 25b via the software interface 30 each time a call is generated.

The active-system indication bit generator 310 writes the active-system indication bit "1" into each ATM cell output to the active system, and writes the active-system indication bit "0" into each ATM cell output to the standby system. As has been described, ATM cells containing identical information are output to the first and second systems.

Figure 5A:
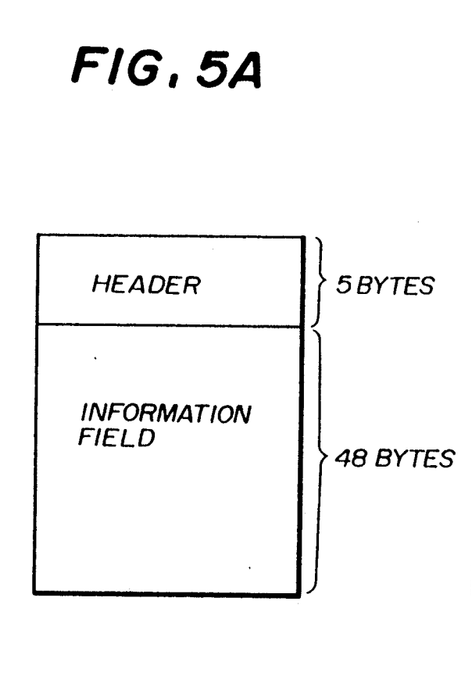
FIGS. 5A and 5B are diagrams of the formats of ATM cells.
Figure 5B:
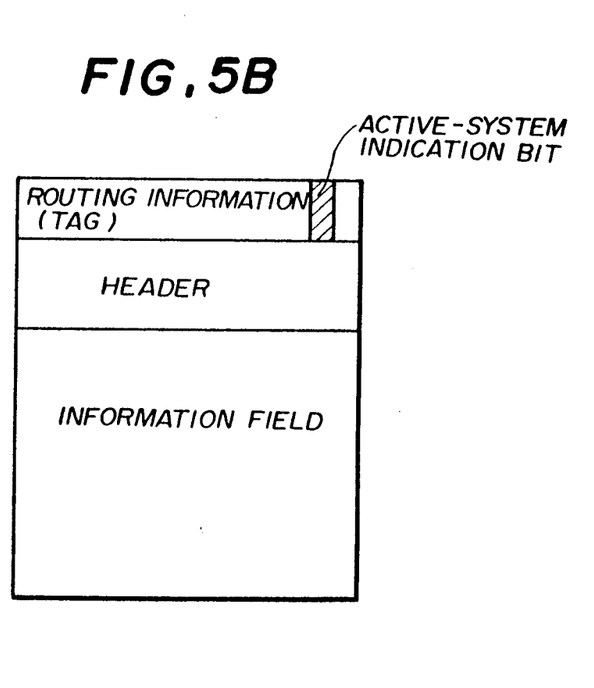

FIG. 5A shows the format of an ATM cell prescribed in the CCITT Recommendations I.361 and I.363. The ATM cell consists of the 5-byte ATM header and the 48-byte information field. The control device 51 determines routing information (switching indication information in each SRM) used to establish a path extending to a remote terminal by discriminating the VPI/VCI contained in each ATM cell, and adds the routing information to the ATM header of each ATM cell. During this operation, the active-system indication bit generator 310 uses one of the bits used for the routing information as the active-system indication bit. Under the control of the control device 51, the active-system indication bit is written into the routing information of each ATM cell, as shown in FIG. 5B.

The ATM cells having identical information are respectively output to the multiplexers 32a and 32b. In this case, the ATM cell output to the active system has the active-system indication bit "1", and the ATM cell output to the standby system has the active-system indication bit "0". The ATM cells from the multiplexer 32a are written into the first buffer 23a via the switch 21a and the demultiplexer 22a. Similarly, the ATM cells from the multiplexer 32b are written into the first buffer 23b via the switch 21b and the demultiplexer 32b. The monitor unit 126a reads the ATM cells from the first buffer 23a one by one, and outputs the VPI/VCI of the read ATM cell and the active-system indication bit to the write controller 33a. Further, the monitor unit 126a outputs the VPI/VCI of the read ATM cell to the VPI/VCI table 25a, which outputs the active-system indication bit related to the VPI/VCI output by the monitor unit 126a. Similarly, the monitor unit 126b reads the ATM cells from the first buffer 23b one by one, and outputs the VPI/VCI of the read ATM cell and the active-system indication bit to the write controller 33b. Further, the monitor unit 126b outputs the VPI/VCI of the read ATM cell to the VPI/VCI table 25b, which outputs the active-system indication bit related to the VPI/VCI output by the monitor unit 126b.

The write controller 33a compares the active-system indication bit from the monitor unit 126a with the active-system indication bit from the VPI/VCI table 25a. In the case where the first system including the switch SWO is the active system, the two bits coincide with each other ("1"). In this case, the ATM cell being considered can be written into the second buffer 24a.

The write controller 33b compares the active-system indication bit from the monitor unit 126b with the active-system indication bit from the VPI/VCI table 25b. In the case where the second system including the switch SW1 is the standby system, the two bits coincide with each other ("0"). In this case, the ATM cell being considered can be written into the second buffer 24b.

When a system switchover is requested by the control device 51, the software interface 30 informs the active-system indication bit generator 310 of the above switchover. Then, the generator 310 starts to execute the reverse operation. That is, the generator 310 writes the active-system indication bit "0" into each ATM cell to be output to the first system which was previously the active system, and writes the active-system indication bit "1" into each ATM cell to be output to the second system which was previously the standby system.

When the first ATM cell for a call (a VPI/VCI pair) after the switchover is read from the first buffer 23b of the active system or the second system, the active-system indication bit of the above first ATM cell from the write controller 126b is "1", while the active-system indication bit related to the same VPI/VCI and read from the VPI/VCI table 25b is "0". When the two bits do not coincide with each other, the write controller 126b changes the active-system identification bit related to the VPI/VCI being considered and stored in the VPI/VCI table 25b from "0" to "1". Hence, subsequent ATM cells respectively having the same VPI/VCI as the above first ATM cell after the switching and respectively having the active-system indication bit "1" can be sequentially written into the second buffer 24b.

In the standby system that is the first system including the switch SW0, when the first ATM cell for a call (a VPI/VCI pair) after the switchover is read from the first buffer 23a, the active-system indication bit of the above first ATM cell from the write controller 126a is "0", while the active-system indication bit related to the same VPI/VCI and read from the VPI/VCI table 25a is "1". When the two bits do not coincide with each other, the write controller 126a changes the active-system identification bit related to the VPI/VCI being considered and stored in the VPI/VCI table 25a from "1" to "0". Hence, subsequent ATM cells respectively having the same VPI/VCI as the above first ATM cell after the switching and respectively having the active-system indication bit "0" are prevented from being written into the second buffer 24a.

In the above-mentioned manner, only ATM cells to be transferred via the active system can be written into the second buffers 24a and 24b. Hence, the multiplexer 27 can read pieces of data from the buffers 24a and 24b and can statistically multiplex the read pieces of data in the unit of ATM cell.

Figure 6:
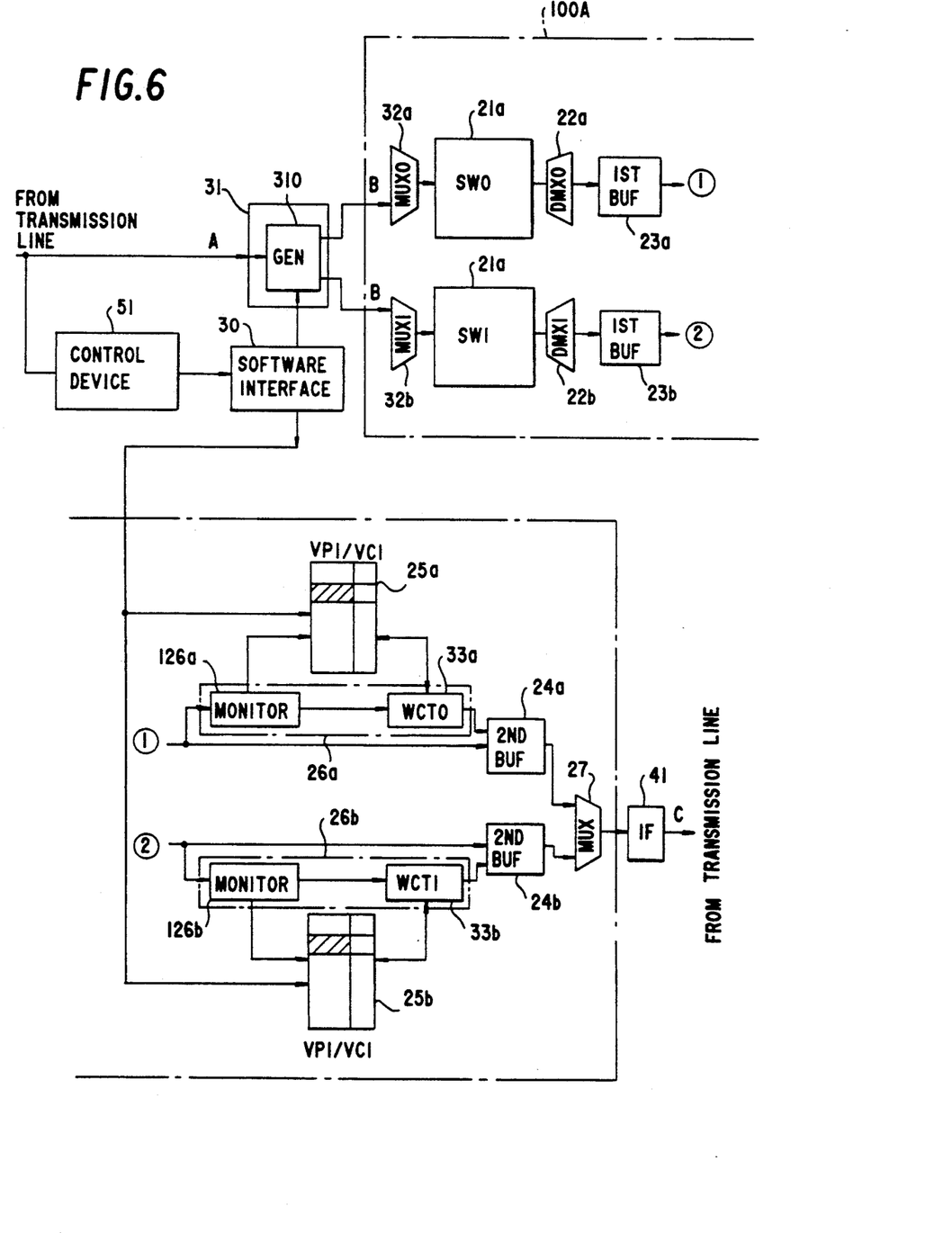
FIG. 6 is a block diagram of a second embodiment of the present invention.

A description will now be given of the second embodiment of the present invention with reference to FIG. 6, in which parts that are the same as parts shown in FIG. 4 are given the same reference numbers as previously. According to the second embodiment of the present invention, the transmission line interface 31 outputs ATM cells to the first and second systems of the duplicated selecting structure 100A. The active-system indication bit "1" is written into the first ATM cells related to the respective VPI/VCI pairs (respective calls) after switching between the active and standby systems. With the above in mind, the monitor unit 126a shown in FIG. 6 is not connected to the write controller 33a, and the monitor unit 126b shown therein is not connected to the write controller 33.

At the time of initializing the ATM exchange, the active-system indication bit is written into each of the VPI/VCI tables 251 and 25b under the control of the control device 51 via the software interface 30. More particularly, the active-system indication bit "1" is written into the VPI/VCI table in the active system, and the bit "0" is written into the VPI/VCI table in the standby system. According to the second embodiment, normally, the active-system indication bit "1" is not written into each ATM cell. That is, "0" is written into the bit position of the active-system indication bit of each ATM cell.

The interface 31 outputs the same ATM cells to both the first and second systems. The ATM cells from the demultiplexer 32a are written into the first buffer 23a via the switch 21a and the demultiplexer 22a. Similarly, the ATM cells from the demultiplexer 32b are written into the first buffer 23b via the switch 21b and the demultiplexer 22b. The monitor unit 126a reads the VPI/VCI and the active-system indication bit of each ATM cell. In this case, the active-system indication bits in all ATM cells are "0". The monitor unit 126b reads the VPI/VCI and the active-system indication bit of each ATM cell. In this case, the active-system indication bits in all ATM cells are "0".

The write controller 33a prevents ATM cells to which the active-system indication bits "0" are respectively assigned in the VPI/VCI table 25a from being written into the second buffer 24a, and allows ATM cells to which the active-system indication bits "1" are respectively assigned in the VPI/VCI table 25a from to be written into the second buffer 24a. Similarly, the write controller 33b prevents ATM cells to which the active-system indication bits "0" are respectively assigned in the VPI/VCI table 25b from being written into the second buffer 24b, and allows ATM cells to which the active-system indication bits "1" are respectively assigned in the VPI/VCI table 25b from to be written into the second buffer 24b.

After the switching between the active system and the standby system is performed, the active-system indication bit generator 310 writes the active-bit indication bit "1" into each of the first cells respectively related to the VPI/VCI pairs (calls). The above writing is carried out for the ATM cells to be output to both the active system and the standby system. In other words, the first ATM cells to be output to the active and standby systems after switching respectively have the active-system indication bit "1".

It will now be assumed that the first system is changed from the active system to the standby system and the second system is changed from the standby system to the active system. The monitor unit 126a detects the "1" of the active-system indication bit of the first ATM cell, and changes the active-system indication bit related to the same VPI/VCI as that of the first ATM cell from "1" to "0". Hence, the first ATM cell being considered cannot be written into the second buffer 24a. The above operation is carried out for each of the first ATM cells related to the respective VPI/VCI pairs.

The monitor unit 126b detects the "1" of the active-system indication bit of the first ATM cell, and changes the active-system indication bit related to the same VPI/VCI as that the first ATM cell from "0" to "1". Hence, the first ATM cell being considered is written into the second buffer 24b.

In the above-mentioned manner, the active-system indication bits stored in the tables 25a and 25b are changed each time the first ATM cells having the respective VPI/VCI pairs are detected by the monitor units 126a and 126b.

The ATM cells subsequent to the first ATM cells having the respective VPI/VCI pairs are assigned the active-system indication bit "0", and are output to both the first and second systems. The active-system indication bits stored in the table 25a are "0" after the corresponding first ATM cells have been received. Hence, the ATM cells subsequent to the respective first ATM cells are prevented from being written into the second buffer 24a. The active-system indication bits stored in the table 25b are "1" after the corresponding first ATM cells have been received. Hence, the ATM cells subsequent to the respective first ATM cells are written into the second buffer 24b.

The multiplexer 27 performs the statistic multiplexing operation on the received ATM cells from the second buffers 24a and 24b.

According to the second embodiment of the present invention, it is not necessary to compare the active-system indication bit contained in each ATM cell with the corresponding bit stored in the tables 25a and 25b. That is, it is possible to control the writing of the second buffers 24a and 24b by only controlling the active-system indication bits stored in the tables 25a and 25b. Hence, the second embodiment shown in FIG. 6 is simpler than the first embodiment shown in FIG. 4.

The present invention is not limited to the specifically disclosed embodiments, and variations and modifications may be made without departing from the scope of the present invention.

What is claimed is:

1. A control system for switching between a first system and a second system of a duplicated structure in an Asynchronous Transfer Mode (ATM) exchange, one of the first and second systems operating as an active system, and the other one of the first and second systems operating as a standby system, said control system comprising:

generator means for writing specific bits into ATM cells received via an input transmission line, the specific bits respectively written into ATM cells to be transferred via the active system indicating a first state, said specific bits respectively written into the ATM cells to be transferred via the standby system indicating a second state;

first table means, provided in the first system, for storing the specific bits respectively assigned to VPI/VCI pairs related to the ATM cells transferred via the first system;

second table means, provided in the second system, for storing the specific bits respectively assigned to VPI/VCI pairs related to the ATM cells transferred via the second system; and selecting means, coupled to said generator means and said first and second table means, for comparing the specific bits written into the ATM cells with the specific bits stored in the first and second table means by using the VPI/VCI pairs of the ATM cells and for outputting only ATM cells respectively having specific bits respectively indicating the first state to an output transmission line.

2. The control system as claimed in claim 1, wherein said selecting means comprises:

first buffer means for storing the ATM cells transferred via the first system;

second buffer means for storing the ATM cells transferred via the second system;

first write control means for comparing the specific bit of a first one of the ATM cells transferred via the first system with the specific bit stored in said first table means and related to the VPI/VCI pair of said first one of the ATM cells and for writing said first one of the ATM cells into said first buffer means when both the specific bit of said first one of the ATM cells and the specific bit stored in said first table means indicate the first state; and second write control means for comparing the specific bit of a second one of the ATM cells transferred via the second system with the specific bits stored in said second table means and related to the VPI/VCI pair of said second one of the ATM cells and for writing said second one of the ATM cells into said second buffer means when both the specific bit of said second one of the ATM cells and the specific bit stored in said second table means indicate the first state.

3. The control system as claimed in claim 2, wherein said selecting means comprises:

first monitor means for changing one of the specific bits stored in said first table means from the first state to the second state or vice versa when one of the specific bits related to one of the ATM cells transferred via the first system does not coincide with said one of the specific bits stored in said first table means; and second monitor means for changing one of the specific bits stored in said second table means from the second state to the first state or vice versa when one of the specific bits related to one of the ATM cells transferred via the second system does not coincide with said one of the specific bits stored in said second table means.

4. The control system as claimed in claim 2, wherein:

said first write control means prevents said first one of the ATM cells from being written into said first buffer means when both the specific bit of said first one of the ATM cells and the specific bit stored in said first table means and related to the VPI/VCI pair of said first one of the ATM cells indicate the second state; and said second write control means prevents said second one of the ATM cells from being written into said second buffer means when both the specific bit of said second one of the ATM cells and the specific bit stored in said second table means and related to the VPI/VCI pair of said second one of the ATM cells indicate the second state.

5. The control system as claimed in claim 3, wherein:

said first write control means prevents said first one of the ATM cells from being written into said first buffer means when both the specific bit of said first one of the ATM cells and the specific bit stored in said first table means and related to the VPI/VCI pair of said first one of the ATM cells indicate the second state; and said second write control means prevents said second one of the ATM cells from being written into said second buffer means when both the specific bit of said second one of the ATM cells and the specific bit stored in said second table means and related to the VPI/VCI pair of said second one of the ATM cells indicate the second state.

6. The control system as claimed in claim 1, wherein said generator means comprises means for writing the specific bit indicating the first state into each of the ATM cells to be transferred via the first system and for writing the specific bit indicating the second state into each of the ATM cells to be transferred via the second system in a case where the first and second systems operate as the active and standby systems, respectively, and for starting to write the specific bit indicating the first state into each of the ATM cells to be transferred via the second system and for starting to write the specific bit indicating the second state into each of the ATM cells to be transferred via the first system when switching between the active system and the standby system is carried out.

7. The control system as claimed in claim 1, wherein said selecting means further comprises:

first switch means for carrying out a first switching operation an the ATM cells transferred via the first system;

second switch means for carrying out a second switching operation on the ATM cells transferred via the second system, and wherein said generator means comprises means for writing specific bits into respective routing information fields of ATM cells received via the input transmission line, said respective routing information fields comprising routing information concerning the first and second switching operations.

8. A control system for switching between a first system and a second system of a duplicated structure in an Asynchronous Transfer Mode (ATM) exchange, one of the first and second systems operating as an active system, and the other one of the first and second systems operating as a standby system, said control system comprising:

generator means for writing specific bits having a first state into ATM cells received via an input transmission line in a first case where no switching is indicated and for writing specific bits having a second state into first ATM cells related to respective VPI/VCI pairs obtained after switching;

first table means, provided in the first system, for storing the specific bits respectively assigned to VPI/VCI pairs related to the ATM cells transferred via the first system, the specific bits stored in the first table means respectively indicating the second state when the first system operates as the active system;

second table means, provided in the second system, for storing the specific bits respectively assigned to VPI/VCI pairs related to the ATM cells transferred via the second system, the specific bits stored in the second table means respectively indicating the first state when the second system operates as the standby system; and selecting means, coupled to said generator means and said first and second table means, for selecting ATM cells transferred via the first system when the first system operates as the active system and for selecting ATM cells transferred via the second system which was previously the standby system but has become the active system because of the switching after changing one of the specific bits stored in said second table means and related to the VPI/VCI pair of one of said first ATM cells from the first state to the second state each time said one of said first ATM cells is received.

9. The control system as claimed in claim 8, wherein said selecting means comprises:

first buffer means for storing the ATM cells transferred via the first system;

second buffer means for storing the ATM cells transferred via the second system;

first write control means for writing ATM cells transferred via the first system into the first buffer means when the first system operates as the active system and for changing the specific bits stored in said first table means and related to the VPI/VCI pairs of said first ATM cells since the switching from the second state to the first state when the specific bits of said first ATM cells are detected; and second write control means for writing ATM cells transferred via the second system into the second buffer means when the second system operates as the active system and for changing the specific bits stored in said second table means and related to the VPI/VCI pairs of said first ATM cells since the switching from the second state to the first state when the specific bits of said first ATM cells are detected.

10. The control system as claimed in claim 9, wherein:

said first write control means comprises means for preventing the ATM cells transferred via the first system from being written into the first buffer means when the specific bits stored in said first table means respectively indicate the first state; and said second write control means comprises means for preventing the ATM cells transferred via the second system from being written into the second buffer means when the specific bits stored in said second table means respectively indicate the second state.

* * * * *